QUASI-REGENERATIVE PULSE GATING CIRCUIT

Filed June 10, 1952 5 Sheets-Sheet 1

(at time $t_1$)

(at time $t_2$)

INVENTOR.
Robert B. Trousdale
BY J. L. Bowes
Attorney

QUASI-REGENERATIVE PULSE GATING CIRCUIT

Filed June 10, 1952 5 Sheets-Sheet 2

(time $t_1$ (times $t_2$ & $t_4$)

(time $t_3$)

INVENTOR.
Robert B. Trousdale
BY T. L. Bowes
Attorney

QUASI-REGENERATIVE PULSE GATING CIRCUIT

Filed June 10, 1952 5 Sheets-Sheet 3

INVENTOR.
Robert B. Trousdale
BY T. L. Bowes
Attorney

Dec. 11, 1956 R. B. TROUSDALE 2,773,982

QUASI-REGENERATIVE PULSE GATING CIRCUIT

Filed June 10, 1952 5 Sheets-Sheet 4

INVENTOR.
Robert B. Trousdale
BY T. L. Bowes
Attorney

Dec. 11, 1956 R. B. TROUSDALE 2,773,982

QUASI-REGENERATIVE PULSE GATING CIRCUIT

Filed June 10, 1952 5 Sheets-Sheet 5

$$\frac{R_1 R_2 R_3}{R_1 R_2 + R_1 R_3 + R_2 R_3} = R_T$$

$$\frac{E_b R_2 R_3 + E_1 R_1 R_2 + dE_a R_1 R_2}{R_1 R_2 + R_1 R_3 + R_2 R_3} = E_T$$

$$\frac{R_1 R_2 R_3}{R_1 R_2 + R_1 R_3 + R_2 R_3} = R_T$$

$$\frac{E_b R_2 R_3 + E_1 R_1 R_2 + dR_1 R_2}{R_1 R_2 + R_1 R_3 + R_2 R_3}\ E_T$$

INVENTOR.
Robert B. Trousdale
BY
T. L. Bowes
Attorney

United States Patent Office 2,773,982

Patented Dec. 11, 1956

2,773,982

QUASI-REGENERATIVE PULSE GATING CIRCUIT

Robert B. Trousdale, Rochester, N. Y., assignor, by mesne assignments, to General Dynamics Corporation, a corporation of Delaware Continuation of abandoned application Serial No. 246,094, September 11, 1951. This application June 10, 1952, Serial No. 292,676

15 Claims. (Cl. 250—27)

The present invention relates to pulse gating circuits and more particularly to circuits for controlling the flow of pulses through diode rectifiers of the crystal type. While the present invention is of general utility, it is particularly suitable for and will be described in connection with an electronic telephone system of the improved form disclosed and claimed in the copending application, Serial No. 134,974 of Frank A Morris and Robert B. Trousdale, which was filed December 24, 1949, and is assigned to the same assignee as the present invention, and the quasi-regenerative pulse gating circuit of the present invention is particularly adapted for use in the coincidence tube circuits of the line finder and the dial impulse registers of the connector in the electronic telephone system described in the application identified above. Specifically, the present invention is a continuation in part, of the above identified copending application, Serial No. 134,974, and constitutes a continuation of my copending application, Serial No. 246,094, filed on September 11, 1951, and now abanoned and assigned to the same assignee as the present invention.

In many instances diode rectifiers, which may be of the crystal type, are employed as gating devices for selectively gating pulses to a common load impedance. Conventionally, the diode is blocked by a suitable bias voltage source and the bias voltage is removed when it is desired to pass signal pulses through the rectifier. The impedance of a crystal diode varies considerably as the current through the diode is varied and when a relatively small current is flowing through the diode, the impedance of the crystal is very high. When the crystal is used to gate a pulse signal from a low impedance line into a relatively high load resistance, the impedance variation of the crystal permits a capacity loading effect which distorts the pulses and reduces the amplitude thereof. In order to preserve the wave shape of the pulses which are passed through the rectifier, it is necessary to maintain a relatively high current through the rectifier such that changes in the signal voltage do not substantially affect the impedance of the crystal. However, in actual practice it is difficult to maintain a high current through the crystal at all times because of the high resistance of decoupling circuits which are associated with the controlling tube and the high anode circuit resistance which is required to derive control pulses suitable for controlling a succeeding tube in pulse counting chain applications.

Accordingly, it is an object of the present invention to provide a new and improved quasi-regenerative pulse gating circuit for controlling the flow of pulses through a crystal gating rectifier.

It is another object of the present invention to provide a crystal gating circuit which is adapted to be used with high impedance decoupling networks without distortion of the wave shape of the transmitted pulses.

It is a further object of the present invention to provide a quasi-regenerative pulse gating circuit employing crystal gating rectifiers wherein the high frequency components of a pulse are preserved during transmission through the gating circuit.

It is still a further object of the present invention to provide a crystal rectifier type of gating circuit wherein the crystal is held fully open so as to pass pulses therethrough without distortion despite variations in the pulse amplitude.

Another object of the present invention resides in the provision of a quasi-regenerative pulse gating circuit for controlling the flow of pulses through anyone of a plurality of crystal gating rectifiers wherein unblocking of one rectifier positively blocks the other rectifiers from developing pulses across a common load impedance.

A further object of the present invention resides in the provision of a quasi-regenerative pulse gating circuit in which a pulse gating crystal rectifier is maintained in a conducting state at all times regardless of variations in the pulse voltage supplied thereto.

The invention, both as to its organization and method of operation, together with further objects and advantages thereof, will best be understood by reference to the following specification taken in connection with the accompanying drawings, in which:

Figs. 1, 2, *3a*, *3b*, *4a*, *4b*, *5a*, *5b*, *6a*, *6b*, and *6c*, are elementary circuit diagrams of a quasi-regenerative pulse gating circuit embodying the principles of the present invention;

Fig. *2a* is a typical characteristic curve of a crystal gating rectifier which may be employed in the quasi-regenerative pulse gating circuits of the present invention.

Figure 1:
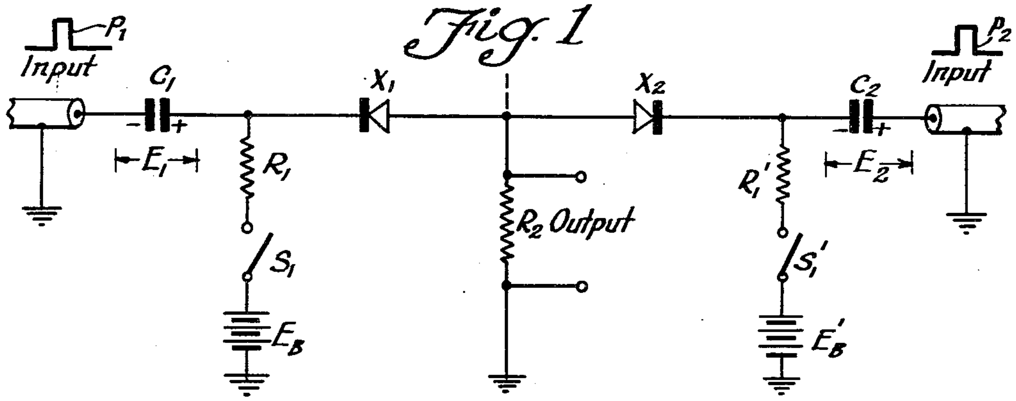

Referring now to the drawings and more particularly to Fig. 1 thereof, there is illustrated a quasi-regenerative pulse gating circuit embodying the features of the present invention. Generally considered, the pulse gating circuit of Fig. 1 comprises a plurality of crystal rectifier gating stages, two of which are shown in this figure, each of which is capable of producing pulses across the common load resistor $R_2$ from a plurality of pulse sources. More specifically, the first crystal rectifier gating stage comprises the condenser $C_1$ and the rectifier $X_1$ which are connected in series from the ungrounded terminal of a source of pulses $P_1$ to the ungrounded side of the common load resistor $R_2$. The second crystal rectifier gating stage comprises the condenser $C_2$ and the rectifier $X_2$ which are connected in series from the ungrounded terminal of another source of pulses $P_2$ to the ungrounded side of the common resistor $R_2$.

Each of the pulse gating stages, such as the first gating stage, has associated therewith an unblocking circuit which, when energized, is effective completely to unblock the associated gating rectifier and to block all other gating rectifiers thereby preventing them from the transmission of pulses to the common load resistor $R_2$. More specifically, an unblocking circuit, including the series connected resistor $R_1$, the switch $S_1$ and the positive potential source $E_B$, is connected from the junction point of the condensor $C_1$ and the rectifier $X_1$ to ground, i. e., to one side of the pulse source $P_1$ and the common load resistor $R_2$.

Figure 2:
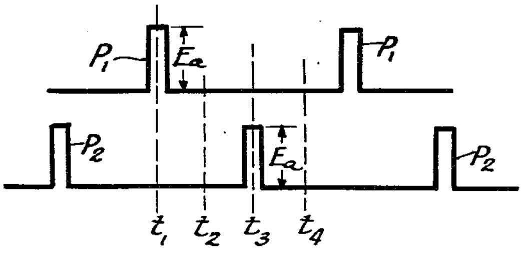

Identical unblocking circuits are associated with each of the other pulse gating stages. Thus, the second pulse gating stage includes the unblocking circuit comprising the series-connected resistor $R_1'$, the switch $S_1'$, and the voltage source $E_B'$, which are connected between the junction point of the rectifier $X_2$ and the condenser $C_2$ to ground. Initially, all of the switches $S_1$, $S_1'$, etc., are open and the pulses $P_1$, $P_2$, etc., are all developed across the common load resistor $R_2$. In the illustrated embodiment the series of pulses $P_1$ are of an amplitude $E_a$ (Fig. 2) and the pulses $P_2$ are likewise of an amplitude $E_a$ and are displaced 180° in phase from the pulses $P_1$.

Figure 2A:
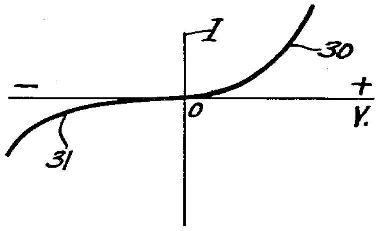

The rectifiers $X_1$, $X_2$, etc., may be of any suitable type such as germanium or the like, and are employed to pass the pulses $P_1$ and $P_2$ from a low impedance source, such as the illustrated coaxial cables, to the relatively high impedance load circuit illustrated as the resistor $R_2$. The internal resistance of the crystal rectifiers $X_1$, $X_2$, etc., varies substantially as shown in Fig. 2*a* wherein the voltage-current characteristic of a typical crystal rectifier is illustrated. Referring to this figure, when a positive voltage V is applied to the anode of the crystal rectifier, the current flow through the rectifier follows the characteristic curve 30. Also, when a negative voltage of sufficient magnitude is impressed upon the anode the crystal rectifier current will flow through the rectifier in the reverse or backward direction in accordance with the characteristic curve 31. In this connection it will be understood that the characteristic curve 31 is plotted on a substantially smaller scale than the curve 30 due to the fact that the reverse current through the rectifier is practically negligible for small negative potentials impressed across the rectifier.

In considering the variation of the rectifier current as a function of the potential impressed across the rectifier, it is evident that near the origin of the curve 30, the rectifier draws a relatively small amount of current and the resistance of the rectifier has a substantial value. For example, with a germanium crystal such as the commercial type 1N34, the resistance of the crystal rectifier is about 250 ohms for one-half a volt applied across the rectifier, and about 150 ohms for three-fourths of a volt applied across the rectifier. With smaller voltages, the resistance rises very rapidly and the crystal rectifier forward resistance may be as high as one megohm at very low currents.

Considering first the operation of the quasi-regenerative pulse gating circuit shown in elementary form in Fig. 1, when all of the unblocking switches $S_1$, $S_1'$, etc., are open, pulses from each low impedance source are coupled through the coupling condenser and the crystal gating rectifier to the output resistor $R_2$. For example, in the first pulse gating stage the pulses $P_1$ are coupled through the condenser $C_1$ and the rectifier $X_1$ so as to appear across the output load resistor $R_2$. Since the pulses $P_1$ are of positive polarity, the rectifier $X_1$ conducts for the duration of the pulse. In a similar manner the pulses $P_2$ are coupled through the condenser $C_2$ and the rectifier $X_2$ to the output resistor $R_2$.

If the first pulse gating stage is to be selected so as to produce the pulses $P_1$ across the resistor $R_2$ to the exclusion of all of the other pulses of the system, the switch $S_1$ is closed by means to be described in more detail hereinafter, so that a positive potential is impressed upon the anode of the rectifier $X_1$ through the resistor $R_1$ and a continuous current is caused to flow through the rectifier $X_1$ and the resistors $R_1$ and $R_2$ connected in series therewith. The pulses $P_2$ which are impressed upon the second pulse gating stage are positively prevented from appearing across the load resistor $R_2$, as will be described in more detail hereinafter. On the other hand, if the switch $S_1$ is opened and the switch $S_1'$ is closed, a positive potential is impressed upon the anode of the rectifier $X_2$ through the resistor $R_1'$ so that a continuous current is caused to flow through the rectifier $X_2$, and the pulses $P_2$ are produced across the output resistor $R_2$ to the exclusion of the pulses $P_1$ and all other pulses of the system. Any desired number of additional crystal rectifier gating stages may be connected across the resistor $R_2$ and unblocking of any one rectifier by means of the above described unblocking circuit will positively and completely block pulses from the other pulse sources from being reproduced across the common output resistor $R_2$.

In order to explain the operation of the present invention a mathematical analysis of the multi-stage crystal rectifier gating circuit described thus far will now be made. Since a large number of simultaneous equations can be set up in analyzing a circuit of this type which would include the non-linear impedance of the crystal rectifiers, the operation of the gating circuit can be analyzed to the required degree of exactness by making several practical assumptions which may be termed engineering approximations. These approximations are as follows:

1. The source impedance of the pulses $P_1$, $P_2$, etc., is very small as compared to other circuit impedances.
2. The pulses themselves have perfectly square corners.
3. The coupling condensers $C_1$, $C_2$, etc., are of sufficiently large capacity that any voltage change thereacross during one pulse cycle is negligible.
4. The forward impedance of the crystal rectifiers $X_1$, $X_2$, etc., is small as compared to other circuit impedances.
5. Stray capacities will be ignored.

The quasi-regenerative pulse gating circuit of Fig. 1 will be examined at the four different instants of time indicated by the characters $t_1$, $t_2$, $t_3$, and $t_4$, where necessary.

On the basis of the above approximations it will be shown that if the values of the individual components of the gating circuit are correct, i. e., in accordance with a formula to be developed hereinafter, the gating circuit of Fig. 1 will exhibit the following properties when the switch $S_1$ is closed:

I. Condenser voltage $E_1$ across the condenser $C_1$ is always of the polarity shown in Fig. 1 and is greater than zero.

II. Condenser voltage $E_2$ across the condenser $C_2$ is always of the polarity shown in Fig. 1 and is less than the peak amplitude $E_a$ of the input pulses $P_2$.

III. Current through the rectifier $X_1$ is in the direction from anode to cathode thereof at all times and the rectifier $X_1$ exhibits its forward resistance at all times.

IV. The pulses $P_1$ appear across the ouput resistor $R_2$ without attenuation.

V. The pulses $P_2$ do not appear across the output resistor $R_2$.

VI. The current required from the unblocking source $E_b$ is a fraction of the current represented by dividing the amplitude $E_a$ of the pulses $P_1$ by the output resistance $R_2$.

On the basis of item III set forth above, it is evident from an analysis of the gating circuit of Fig. 1 that since the generator impedance of the pulses $P_1$, the impedance of the condenser $C_1$, and the impedance of the rectifier $X_1$, are all negligible, the impedance of the gating circuit looking to the left of the resistor $R_2$ is essentially zero at all times. As a result, the right-hand circuit, i. e., the second crystal rectifier gating stage, looks into a short circuit and no portion of the pulses $P_2$ will appear across the output resistor $R_2$. It will also be evident that the right-hand circuit will have no effect on the left-hand circuit with the unblocking circuit thereof disabled so that the right-hand circuit may be eliminated for the first part of the analysis.

Figure 3A:
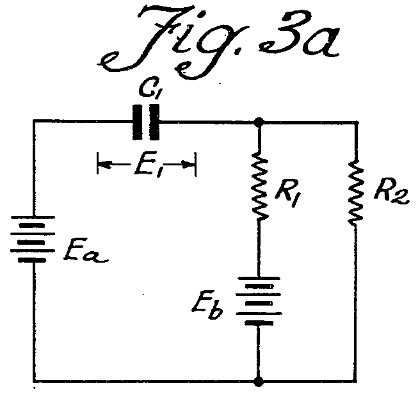
Figure 3B:
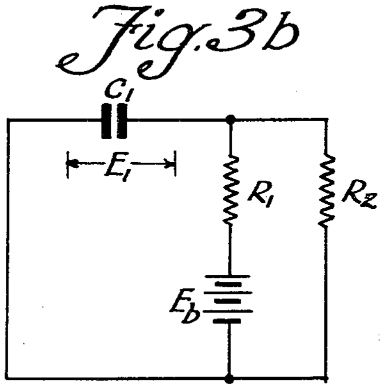

The left-hand portion of the gating circuit of Fig. 1, i. e., the first pulse gating stage, may be redrawn as shown in Fig. 3*a* at time $t_1$, and may also be redrawn as shown in Fig. 3*b* at time $t_2$. The time $t_1$ occurs during one of the pulses $P_1$, and the time $t_2$ occurs somewhere in between these pulses. In this connection it is assumed that the pulses $P_1$ comprise a recurrent pulse wave form, the duty cycle of which is $d$.

Figure 4A:
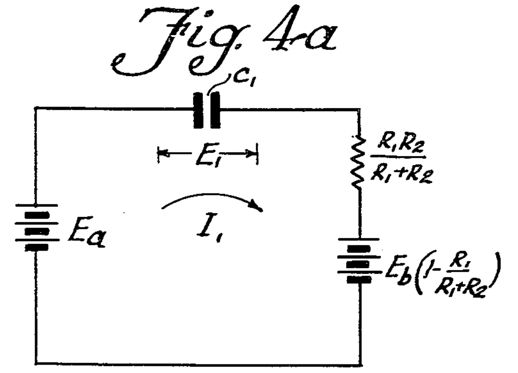
Figure 4B:
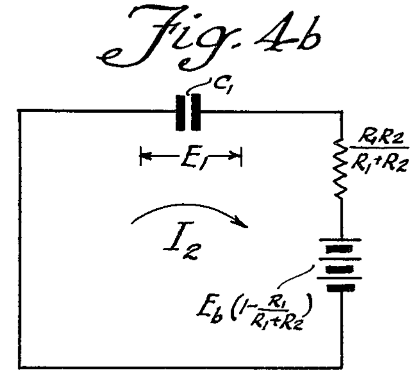

Since the circuits of Figs. 3a and 3b satisfy the requirements for Thevenin transformation, this may be done to simplify these circuits and the transformations thereof are respectively shown in Figs. 4a and 4b of the drawings. Thus, in the transformation of the circuit shown in Fig. 3a, the resistor $R_1$ becomes the resistor $$\frac{R_1R_2}{R_1+R_2}$$

and the voltage source $E_b$ becomes the voltage source $$E_b\left(1-\frac{R_1}{R_1+R_2}\right)$$

Then applying Kirchoff's laws to the circuits of Figs. 4a and 4b and solving for the indicated currents $I_1$ and $I_2$ thereof, we obtain:

$$(1) \qquad I_1=\frac{E_a+E_1-E_b\left(1-\frac{R_1}{R_1+R_2}\right)}{\frac{R_1R_2}{R_1+R_2}}$$

$$(2) \qquad I_2=\frac{E_1-E_b\left(1-\frac{R_1}{R_1+R_2}\right)}{\frac{R_1R_2}{R_1+R_2}}$$

In order for the condenser voltage $E_1$ across the condenser $C_1$ to remain at a fixed average value, the charge, i. e., the current times time, during the on pulse interval of the pulses $P_1$, must equal the charge during the off pulse interval between these pulses and must be of opposite sign. In other words, the net charge entering the condenser $C_1$ over a long period of time must be equal to zero for the condenser voltage $E_1$ to remain constant. If the duty cycle of the pulses $P_1$ is $d$, then the current $I_1$ (Fig. 4a) persists for the duration of the pulse and the current $I_2$ (Fig. 4b) persists for a time $$\frac{1-d}{d}$$

times as long and we may write the following relationship:

$$(3) \qquad I_1+I_2\frac{(1-d)}{d}=0$$

Substituting the values of $I_1$ and $I_2$ of Equations 1 and 2 in Equation 3, we have:

$$(4) \qquad \frac{E_a+E_1-E_B\left(1-\frac{R_1}{R_1+R_2}\right)}{\frac{R_1R_2}{R_1+R_2}}+\frac{(1-d)}{d}\,\frac{E_1-E_B\left(1-\frac{R_1}{R_1+R_2}\right)}{\frac{R_1R_2}{R_1+R_2}}=0$$

Simplifying the terms of Equation 4, we have:

$$(5) \qquad E_a+E_1-E_B\left(1-\frac{R_1}{R_1+R_2}\right)+\frac{(1-d)}{d}\left(E_1-E_B\left[1-\frac{R_1}{R_1+R_2}\right]\right)=0$$

Collecting the $E_1$ terms of Equation 5, we have:

$$(6) \qquad E_1+\frac{(1-d)}{d}\,E_1=-E_a+E_B\left(1-\frac{R_1}{R_1+R_2}\right)+E_B\frac{(1-d)}{d}\left(1-\frac{R_1}{R_1+R_2}\right)$$

Solving for $E_1$, we have:

$$(7) \qquad E_1=-dE_a+E_B\left(1-\frac{R_1}{R_1+R_2}\right)$$

Equation 7 represents the voltage across the condenser $C_1$ in terms of the voltage pulse amplitude $E_a$, the duty cycle $d$, the unblocking voltage $E_b$, the unblocking resistor $R_1$, and the load resistor $R_2$. It must be shown that the polarity of $E_1$ must be positive in order for item III set forth above to be correct.

Figure 5A:
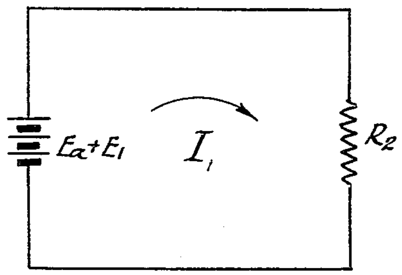
Figure 5B:
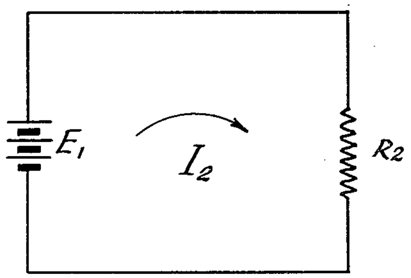

Performing a Thevenin transformation to the left-hand half of the circuits shown in Figs. 3a and 3b, i. e., at times $t_1$ and $t_2$, respectively, we have the circuits shown in Figs. 5a and 5b in which the currents $I_1$ and $I_2$ are respectively flowing. It is obvious from the circuits shown in Figs. 5a and 5b that the voltage $E_1$ across the condenser $C_1$ must be positive, i. e., of the same polarity as the pulses $P_1$ in order that $I_1$ and $I_2$ both be positive, and the current flow through the rectifier $X_1$ be in the direction from anode to cathode at all times, i. e., the requirement stated in item III above. It will also be evident from Figs. 5a and 5b that the voltage change across the output resistor $R_2$ between time $t_1$ and $t_2$ is equal to $E_a$. Thus, the full amplitude of the input voltage pulse $P_1$ appears across the output resistor $R_2$ and the statement of item IV is correct.

Referring to Equation 7 above, it will be evident that the following relationship must hold for Equation 7 to be true:

$$(8) \qquad E_B\left(1-\frac{R_1}{R_1+R_2}\right)>dE_a$$

Simplifying and regrouping the terms of Relationship 8, we have the following:

$$(9) \qquad \frac{E_b}{E_a}>\frac{d(R_1+R_2)}{R_2}$$

Relationship 9 is the basic relationship which controls the magnitude of the unblocking potential source $E_b$ and the unblocking resistor $R_1$ to provide complete gating action in the crystal rectifier gating circuit of Fig. 1. Thus, for example, with a pulse $P_1$, having a duty cycle of 0.1 and an amplitude of 20 volts, an enabling potential source of 150 volts, and a load resistor $R_2$ of 10,000 ohms, we have upon substitution of these values in Relationship 9, the following:

$$(10) \qquad \frac{150}{20}>\frac{0.1\ (R_1+10\text{ k.})}{10\text{ k.}}$$

Solving for $R_1$ we have:

$$(11) \qquad R_1<740\text{ k.}$$

Dividing $E_b$ by $R_1$ in the above example, we have an approximation as to the current supplied by the unblocking source as follows:

$$(12) \qquad \frac{150}{740\text{ k.}}=.203\text{ ma.}$$

Dividing $E_a$ by $R_2$ in the above example, we have the current necessary to cause the input pulse $P_1$ to appear across the load resistor $R_2$ as follows:

$$(13) \qquad \frac{20}{10\text{ k.}}=2\text{ ma.}$$

From Equations 12 and 13 above we see that an unblocking current of .203 milliamperes is required to produce a pulse current of two milliampers and the statement set forth in item VI above is correct. It will also be evident from Relationships 9 and 13, inclusive, that the unblocking current is related to the pulse current by a factor closely approximating the duty cycle $d$. If $E_a$ and hence $R_1$ are very large, this factor approaches the duty cycle $d$ as a limit. It is therefore possible to get a signal current, i. e., the pulse $P_1$, by means of an unblocking current of considerably smaller magnitude. This apparent amplification in current is readily explained when it is understood that the pulse current persists for only a fraction of the total cycle, whereas the unblocking current is a continuous current and hence the average values of the pulse current and the unblocking current are equal over a long period of time.

In considering the operation of the right-hand portion of the gating circuit of Fig. 1, it will be recalled that the generator impedance of the left half of this circuit is equal to zero insofar as the right-hand half of the circuit is concerned. Accordingly, the entire gating circuit of Fig. 1 may be simplified by substituting a zero impedance generator of the correct voltage for the left-hand section of the circuit of Fig. 1. Thus, at time $t_1$ the gating circuit of Fig. 1 may be redrawn as shown in Fig. 6*a*, at times $t_2$ and $t_4$ the circuit of Fig. 1 appears as shown in Fig. 6*b*, and at time $t_3$ the circuit of Fig. 1 appears as shown in Fig. 6*c*.

Figure 6A:
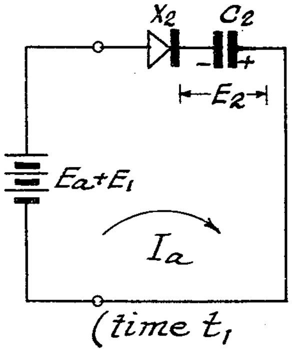
Figure 6B:
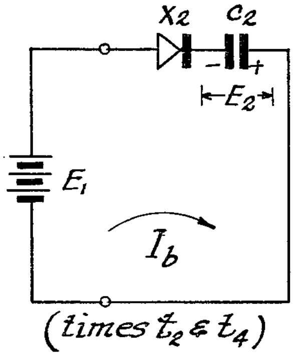
Figure 6C:
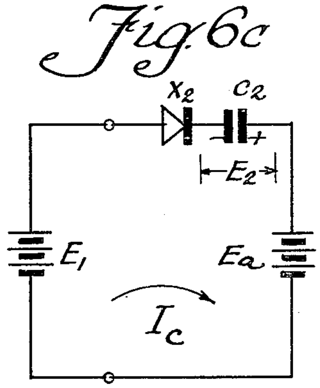

In order to simplify the analysis of the circuits shown in Figs. 6*a*, 6*b*, and 6*c*, we may assume that the voltage on condenser $C_2$ is of the polarity shown. If such is the case, it is obvious from an inspection of these figures that the currents $I_a$ and $I_b$ are positive since the voltages in the respective circuits are additive. Since the currents $I_a$ and $I_b$ are flowing from cathode to anode of the rectifier $X_2$, it will be evident that this rectifier exhibit its back resistance, i. e., a relatively high resistance, in series with the condenser $C_2$.

As in the analysis of the left-hand portion of the circuit of Fig. 1, the net charge entering the condenser $C_2$ must be equal to zero under steady state conditions and if the duty cycle is assumed to be equal to *d*, it will be evident that the current $I_c$ (Fig. 6*c*) must be negative if the two currents $I_a$ and $I_b$ are positive. The resistance of the rectifier $X_2$ thus becomes in Fig. 6*c* the forward resistance of this rectifier. It will also be evident that the currents $I_a$ and $I_c$ persist for a time proportionate to the duty cycle *d*, and the current $I_b$ persists for a time proportionate to the quantity $1-2d$. We may write the expressions for the three currents $I_a$, $I_b$, and $I_c$ as follows:

(14) $$I_a=\frac{E_a+E_1+E_2}{R_B} \qquad R_B=\text{back resistance}$$

(15) $$I_b=\frac{E_1+E_2}{R_B}$$

(16) $$I_c=\frac{E_1+E_2-E_a}{R_F} \qquad R_F=\text{forward resistance}$$

where $R_B$ equals the back resistance of the rectifier $X_2$, and $R_F$ equals the forward resistance of the rectifier $X_2$. Summating the charges and equating to zero, we have

(17) $$I_ad+I_b(1-2d)+I_cd=0$$

Substituting Equations 14, 15, and 16, in Equation 17, we have:

(18) $$\frac{d(E_a+E_1+E_2)}{R_B}+\frac{(1-2d)(E_1+E_2)}{R_B}+\frac{d(E_1+E_2-E_a)}{R_F}=0$$

Expanding Equation 18, we have:

(19) $$\frac{dE_a+dE_1+dE_2+E_1+E_2-2dE_1-2dE_2}{R_B}+\frac{dE_1+dE_2-dE_a}{R_F}=0$$

Regrouping the terms of Equation 19, we have:

(20) $$E_1(R_F-dR_F-dR_B)=E_2(dR_F-R_F-dR_B)+E_a(dR_B-dR_F)$$

Since the duty cycle *d* is a number between zero and one, and the back resistance $R_B$ of the rectifier $X_2$ is very large as compared to the forward resistance $R_F$, Equation 20 may be simplified as follows:

(21) $$E_1(dR_B)=E_2(-dR_B)+E_a(dR_B)$$

or,

(22) $$E_1+E_2=E_a$$

From Equation 22 it will be evident that the sum of the condenser voltages $E_1$ and $E_2$ is equal to the amplitude of the pulses $P_1$. If the voltage $E_1$ across the condenser $C_1$ is just slightly positive, then the voltage $E_2$ across the condenser $C_2$ is just slightly less than the pulse amplitude $E_a$. Accordingly, the conditions set forth in item II above are confirmed.

Considering now the physical operation of the right-hand portion of the gating circuit of Fig. 1, the rectifier $X_2$ conducts in the forward direction during the pulse $P_2$ and charges the condenser $C_2$. The amount of charge acquired during the pulse $P_2$ is just equal to the charge lost between pulses due to leakage through the back resistance of the crystal rectifier $X_2$. The voltage on the condenser $C_2$ is high enough to prevent conduction of the rectifier $X_2$ in the forward direction between the pulses $P_2$ and this voltage is decreased from its maximum value of $E_a$ by an amount equal to the voltage $E_1$ across the condenser $C_1$. The voltage $E_1$ thus represents an assisting voltage to help block the crystal rectifier $X_2$.

While the elementary gating circuit shown in Fig. 1 is entirely suitable for illustration of the basic principles of the present invention, in a fully electronic system it is necessary to provide sufficiently quick acting switch means selectively to connect a desired pulse input to the common output resistor $R_2$. For example, in the line finder portion of an electronic telephone system it is necessary to provide sufficiently quick acting switch means to establish a particular pulse time position within a relatively short period of time. Accordingly, in a line finder circuit arrangement the switches $S_1$ and $S_1'$ are replaced by gaseous discharge tubes which may be fired under the control of pulses applied to the control electrodes thereof.

Figures 7, 8:
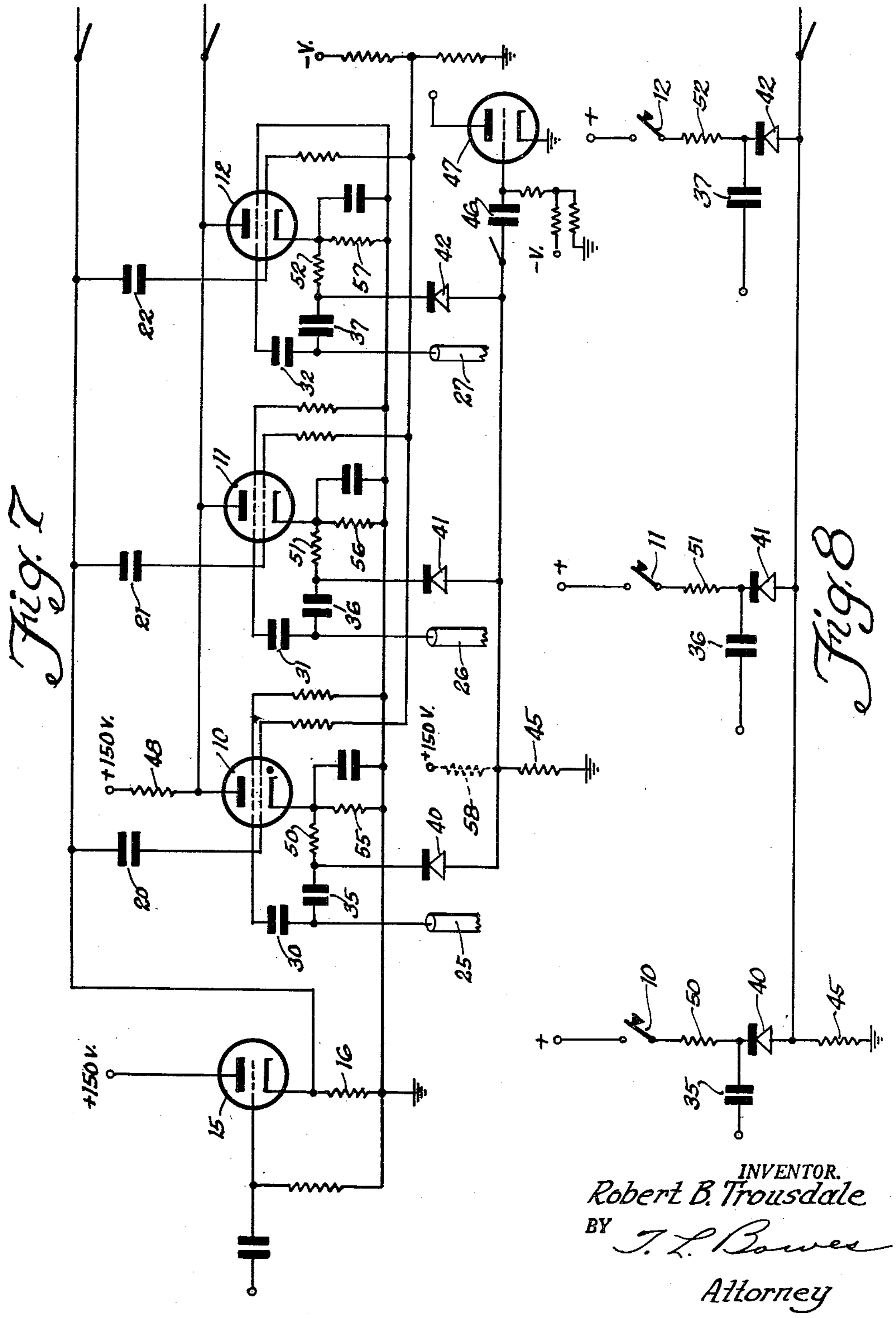
Fig. 7 is a detained schematic diagram of a coincidence tube circuit embodying the features of the quasi-regenerative pulse gating circuit shown in Fig. 1.
Fig. 8 is an elementary circuit diagram of the coincidence tube circuit shown in Fig. 7.

A detailed schematic diagram of a line finder circuit arrangement of this type is shown in Fig. 7 wherein a horizontal string of gaseous discharge control tubes or coincidence tubes, three of which are illustrated at 10, 11, and 12, is employed. While the tubes 10, 11, and 12 may be of either the hot or cold cathode type, they are preferably of the hot cathode type so that a maximum percentage of the supply potential is available for the control of the gating rectifiers associated therewith. The coincidence tubes 10, 11, and 12 form a part of a coincidence tube circuit of the general type disclosed in the copending application Serial No. 134,974 identified above. Such a coincidence tube circuit is used in the line finder portion of the system disclosed in said copending application in connection with an electronic telephone system employing a pulse multiplex form of communication between the calling and called lines. In particular, a decimal type of multiplexing is employed wherein the pulse time positions assigned to particular calling lines are segregated on a decimal basis. Thus, in a coincidence tube circuit suitable for application to an electronic telephone system of this type, a series of ten coincidence tubes, such as the tubes 10, 11, and 12, is employed to provide separation of the pulse time positions on a decimal basis.

As illustrated in Fig. 7, a cathode follower tube 15 is employed to repeat pulses across the cathode resistor 16 thereof which occur in the pulse time position assigned to the calling line. These pulses are connected in parallel through the condensers 20, 21, and 22 to the first control grids of the coincidence gas tubes 10, 11, and 12. Also, gating pulses which occur in successive time positions in repetitive pulse time position frames are transmitted over the low impedance cables 25, 26, and 27 and through the condensers 30, 31, and 32 to the second control grids of the tubes 10, 11, and 12. In this connection it will be understood that the coincidence tube circuit of Fig. 7 may be employed to select the pulse time position of the incoming pulse on a decimal basis.

For example, a first tens pulse is impressed upon the cable 25, the next adjacent tens pulse is impressed upon the cable 26, the third tens pulse is impressed upon the cable 27, etc., so that a selection of the tens pulse time position assigned to the incoming pulse may be obtained. Such a pulse selection occurs by virtue of the coincidence of the incoming pulse to the calling line and the particular tens gating pulse assigned to the calling line. Thus, for example, if a calling line has a tens digit of "1," the input pulses produced across the resistor 16 occur within the first tens pulse interval and, accordingly, the gas tube 10 will be fired upon a coincidence of the input pulse coupled through the condenser 20 and the positive tens pulse coupled through the condenser 30 to the control electrodes of this tube.

The tens pulses produced on the cables 25, 26, and 27 are also coupled through the condensers 35, 36, and 37 to the anodes of the gating rectifiers 40, 41 and 42, respectively, the cathodes of these rectifiers being connected to the common load resistor 45. The pulses produced across the resistor 45 are coupled through the condenser 46 to the control grid of a suitable output tube 47 from which they may be supplied to any suitable load circuit. The anodes of the tubes 10, 11 and 12 are connected through the common anode load resistor 48 to a positive source of potential. The anodes of the rectifiers 40, 41 and 42 are connected respectively through the resistors 50, 51 and 52 to the cathodes of the coincidence tubes 10, 11 and 12, and the cathodes of these tubes are respectively connected through the resistors 55, 56 and 57 to ground potential.

Considering now the operation of the coincidence tube circuit of Fig. 7, which is shown in simplified form in Fig. 8, it will be seen that the output resistor 45 of this circuit corresponds to the output resistor $R_2$ of the elementary circuit shown in Fig. 1. Likewise, the low impedance cables 25, 26 and 27 correspond to the low impedance input sources of the pulses $P_1$ and $P_2$ of the elementary circuit shown in Fig. 1. The coupling condensers 35, 36 and 37 of the coincidence tube circuit of Fig. 7 correspond to the coupling condensers $C_1$ and $C_2$ in the elementary circuit of Fig. 1, and the gating rectifiers 40, 41 and 42 correspond to the crystal rectifiers $X_1$ and $X_2$ in the elementary circuit of Fig. 1. The resistors 50, 51 and 52 of the coincidence tube circuit of Fig. 7 correspond to the resistors $R_1$ and $R_1'$ in the unblocking circuits of the gating circuit shown in Fig. 1, and the positive potential produced across one of the cathode resistors 55, 56 and 57, when the corresponding gate tube is fired is equivalent to one of the positive source of unblocking potential $E_B$ and $E_B'$ of the gating circuit of Fig. 1.

Assuming that an input pulse occurring during the first tens pulse period is produced across the resistor 16, when the input pulses and the first tens pulses are simultaneously applied to the control grids of the coincidence tube 10, this tube fires so that current flows through the common anode resistor 48 and the cathode resistor 45 to ground potential. As described above in connection with the elementary gating circuit of Fig. 1, when none of the tubes 10, 11, and 12 is conducting, the tens pulses respectively impressed upon the cables 25, 26, and 27 are coupled through the respective condensers 35, 36, and 37 and through the corresponding gating rectifiers 40, 41. and 42 to the common output resistor 45. In the actual coincidence tube circuit a series of ten coincidence tubes is employed so that all ten pulses are produced across the common resistor 45 when none of the tubes are fired. Since these tens pulses are relatively steep sided and occur in succession in repetitive pulse time position frames, the net potential produced across the resistor 45 comprises a substantially unidirectional potential. However, since the tens pulses may vary in amplitude, a small undulating signal may be produced across the resistor 45.

When one of the coincidence tubes, such as the tube 10, is fired in the manner described above, the potential produced across the cathode resistor 55 thereof is raised so as to cause continuous conduction of the corresponding gating rectifier 40 in a manner identical to that described above in connection with the unblocking circuit $R_1$, $S_1$, and $E_B$ associated with the first pulse gating stage of the circuit of Fig. 1. When the tube 10 fires and the rectifier 40 is thus rendered fully conductive, the tens pulses impressed upon the cable 25 are transmitted without change through the rectifier 40 to the common output resistor 45. Due to the quasi-regenerative gating action described above in connection with the circuit of Fig. 1, only the tens pulses impressed upon the cable 25 are gated to the common output resistor 45 and the other tens pulses impressed upon the cables 26, 27, etc., are positively prevented from appearing across the output resistor 45. Furthermore, the remaining coincidence tubes 11, 12, etc., are prevented from firing by the provision of the common anode resistor 48 so that when the tube 10 fires the anode potential of the remaining tubes 11, 12, etc., is reduced to prevent these tubes from firing improperly.

If desired, the cathodes of all of the rectifiers 40, 41, and 42 may be operated at the same positive potential by connecting the resistor 58, shown in dotted lines in Fig. 7, from the ungrounded end of the resistor 45 to a positive source of potential. With this arrangement all of the gating rectifiers 40, 41, and 42 are normally biased against conduction. However, the quasi-regenerative gating action described above in connection with Fig. 1 is still obtained when one of the coincidence tubes is fired, the resistor 58 serving to prevent the appearance of pulses across the common resistor 45 before one of the coincidence tubes is fired.

Figure 9:
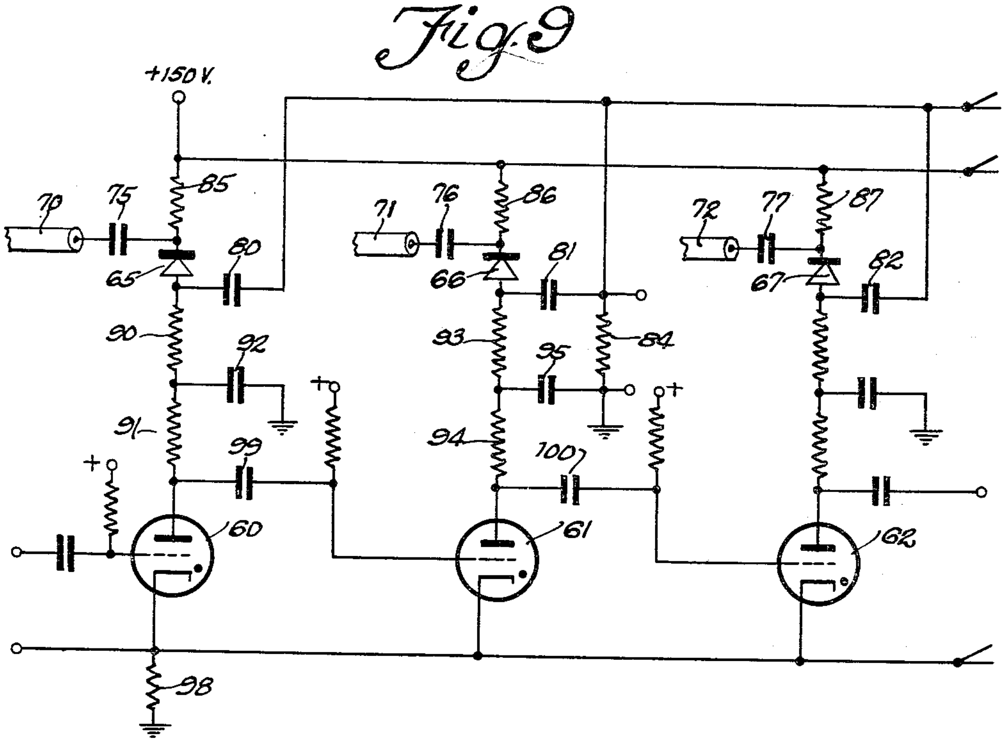
Fig. 9 is a detailed schematic diagram of an impulse register counting chain circuit embodying the features of the quasi-regenerative pulse gating circuit shown in Fig. 1.

In accordance with an alternative embodiment of the present invention the crystal gating rectifiers of the pulse gating circuit may be rendered fully conductive by means of a series circuit wherein substantially the entire amount of the control tube current is made to flow through the crystal rectifier. An embodiment of this type is shown in Fig. 9 wherein a plurality of modified crystal rectifier gating circuits are employed in a pulse counting chain of the general type described and claimed in the copending application Serial No. 134,974 referred to above. More particularly, the pulse gating circuit of Fig. 9 corresponds generally to one of the digit register units contained in the connector described in detail in the electronic telephone system of the copending application Serial No. 134,974 identified above.

Referring now to Fig. 9, a plurality of gas tubes 60, 61, and 62 are employed as electronic switches to control the gating of pulses through the crystal rectifiers 65, 66, and 67. Positive pulses from the low impedance cables 70, 71, and 72 are respectively applied through the coupling condensers 75, 76, and 77 to the anodes of the rectifiers 65, 66, and 67. The pulses which are gated by the rectifiers 65, 66, and 67, are coupled through the respective coupling condensers 80, 81, and 82 to the common output resistor 84. The anodes of the rectifiers 65, 66, and 67 are are also respectively connected through the resistors 85, 86, and 87 to a positive source of potential. The cathode of each of the rectifiers 65, 66, and 67 is connected through a decoupling network and a load resistance to the anode of the corresponding control tube. Thus, the cathode of the rectifier 65 is connected through the decoupling resistor 90 and the anode load resistor 91 to the anode of the tube 60, and a decoupling condenser 92 is connected from the junction point of these resistors to ground. Likewise, the cathode of the rectifier 66 is connected through the resistors 93 and 94 to the anode of the tube 61 and a decoupling condenser 95 is employed. The cathodes of the counting tubes 60, 61, and 62 are connected through the common resistor 98 to ground potential and the anode of each counting tube is connected to the control grid of the next counting tube in the chain. Thus, the anode of the tube 60 is coupled through the condenser 99 to the control grid of the tube 61, the anode of the tube 61 is coupled through the condenser 100 to the control grid of the tube 62, etc. The control grid of each of the tubes 60, 61, and 62 is biased to a positive potential source which is sufficient to permit the tube to be fired from the succeeding counting tube but is not sufficient to fire the tube alone. The tubes 60, 61, and 62 of the chain are fired in sequence by means of positive register drive pulses which are impressed across the common cathode resistor 98, and an input pulse from a preceding priming tube is used to fire the first counting tube 60 in the chain.

Assuming that the first tube 60 is fired by the input pulse from the preceding primer tube, when the next register drive pulse appears across the resistor 98 the cathodes of all of the counting tubes are raised to a positive potential sufficient to extinguish any one tube with the result that the tube 60 is extinguished. When the tube 60 is extinguished and current ceases to flow through the resistor 91 there is produced at the anode of the tube 60 a positive pulse which is coupled through the condenser 99 to the control grid of the next tube 61. For the duration of the positive register drive pulse produced across the resistor 98, the cathode of the tube 61 is positive so that this tube is prevented from firing. However, after the register drive pulse disappears the positive pulse coupled to the control grid of the tube 61 fires this tube. Accordingly, successive pulses produced across the resistor 98 cause successive ones of the counting tubes 60, 61, and 62 to be fired in sequence.

When one of the control tubes is fired in the manner described above, the entire space current of the tube flows through the associated crystal rectifier. Thus, when the tube 60 is fired, the tube current flows from the positive terminal of the potential supply through the resistor 85, the restifier 65, the resistors 90 and 91, the tube 60, and the common cathode resistor 98. Accordingly, the entire tube current flows through the rectifier 65 so that this rectifier remains fully open during the period of the positive pulses which are impressed upon the cable 70 and coupled through the condenser 75 to the anode of the rectifier 65. These pulses are gated through the rectifier 65 and are coupled through the condenser 80 to the common output resistor 84 and the pulses produced across the resistor 84 may be utilized by any suitable load circuit.

Figure 10:
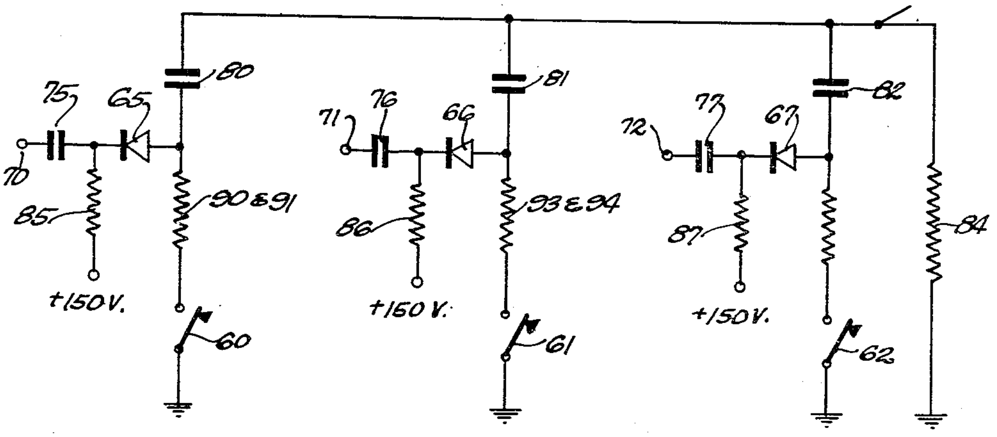
Fig. 10 is an elementary circuit diagram of the counting chain circuit of Fig. 9.

From the foregoing description of the pulse counting chain shown in Fig. 9, it will be evident that the pulse gating stages included therein are similar in many respects with the pulse gating stages described in detail in connection with the line finder coincidence tube circuit of Fig. 7 and the elementary pulse gating circuit of Fig. 1. In order to simplify the counting tube chain of Fig. 9, for the purposes of mathematical analysis thereof, there is shown in Fig. 10 an elementary circuit diagram in which the corresponding circuit elements have been given corresponding reference numerals, it being understood that an additional number of counting stages may be connected to the common output resistor 84 as desired. It will further be understood that the resistors 90 and 91 are shown as a single resistor in the elementary circuit of Fig. 10, and the tube 60 is shown as a simple switch in this figure.

Figure 11:
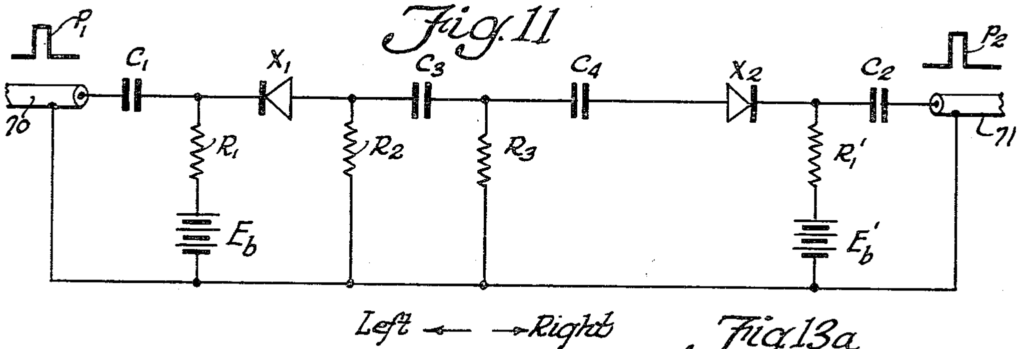
Figs. 11, 12, *13a*, *13b*, *14a*, *14b*, *15a*, and *15b*, are simplified elementary circuit diagrams of the counting chain circuit of Fig. 9 used to explain the operation thereof.

In order to show the basic similarity between the elementary gating circuit of Fig. 1 and the pulse counting chain circuit of Fig. 9, the elementary circuit of Fig. 10 is further simplified in Fig. 11 wherein only the first and second pulse gating stages are shown. Furthermore, in Fig. 11 the same reference characters have been applied to elements which are similar to the elementary gating circuit described in detail in connection with Fig. 1. Referring to Fig. 11, the condenser $C_1$ corresponds to the coupling condenser 75 (Figs. 9 and 10), the resistor $R_1$ corresponds to the anode resistor 85 associated with the first counting tube 60, the rectifier $X_1$ corresponds to the gating rectifier 65, the resistor $R_2$ corresponds to the resistors 90 and 91 which are connected to ground through the counting tube 60 when this tube is fired, the condenser $C_3$ corresponds to the coupling condenser 80, and the common load resistor $R_3$ corresponds to the resistor 84 of Figs. 9 and 10. In the second pulse gating stage, i. e. the right hand half of the circuit of Fig. 11, the condenser $C_2$ corresponds to the condenser 76 (Figs. 9 and 10), the resistor $R_1'$ corresponds to the resistor 86, the rectifier $X_2$ corresponds to the rectifier 66, and the condenser $C_4$ corresponds to the condenser 81.

It will be evident from an examination of Fig. 11 that the elementary circuit shown therein is very similar to the elementary circuit described in detail in connection with Fig. 1, except for the fact that the crystal rectifiers $X_1$ and $X_2$ are coupled through the respective condensers $C_3$ and $C_4$ to the common load resistor $R_3$. Also, the unblocking circuit of each pulse gating stage consists of the resistor $R_2$ which is connected to ground through the associated counting tube, the resistor $R_1$, the unblocking potential supply $E_B$ being permanently connected into the circuit in each stage.

In analyzing the counting chain circuit of Fig. 11, the approximations and assumptions used in connection with the mathematical analysis of the circuit of Fig. 1 may conveniently be employed. Thus, it is assumed that the circuit conditions are such that the rectifier $X_1$ always conducts current in the forward direction and exhibits its forward resistance at all times. Since the forward resistance of the rectifier $X_1$ is small as compared to other circuit impedances, this element may be eliminated and the left-hand portion of the circuit of Fig. 11 may be redrawn as in Fig. 12 with this rectifier eliminated. Since the right-hand portion of the gating circuit of Fig. 11 looks into a short circuit consisting of the series impedances of the condenser $C_3$, the rectifier $X_1$, the condenser $C_1$, and the source impedance of the pulses $P_1$, the input pulses $P_2$ do not appear across the common load resistor $R_3$. Also, since the resistors $R_1$ and $R_2$ of Fig. 11 are relatively large as compared with the load resistor $R_3$, they may be disregarded in the analysis of the modified load circuit arrangement, and the circuit of Fig. 12 may be redrawn as shown in Fig. 13*a* at the time $t_1$, and as shown in Fig. 13*b* at the time $t_2$. From the simplified series circuits of Figs. 13*a* and 13*b* we may write the expressions for the currents $I_1$ and $I_2$ thereof as follows:

$$I_1=\frac{E_a+E_1-E_2}{R_3} \tag{23}$$

$$I_2=\frac{E_1-E_2}{R_3} \tag{24}$$

If it is assumed that the duty cycle of the pulses $P_1$ is equal to $d$ and the charge entering the condenser $C_3$ is equal to the charge leaving this condenser, we have:

$$dI_1+(1-d)I_2=0 \tag{25}$$

or $$\frac{d(E_a+E_1-E_2)}{R_3}+\frac{(1-d)(E_1-E_2)}{R_3}=0 \tag{26}$$

Expanding terms and solving for $E_2$ in Equation 26, we have:

$$E_2=E_1+dE_a \tag{27}$$

Figure 12:
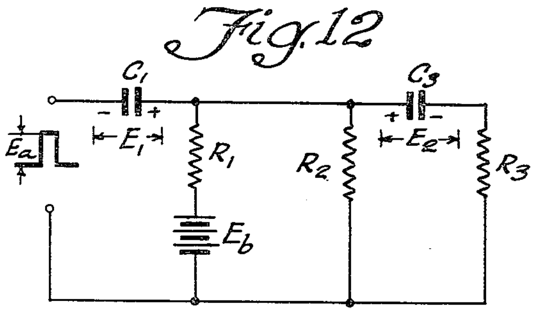
Figure 13A:
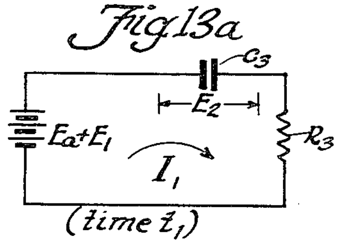
Figure 13B:
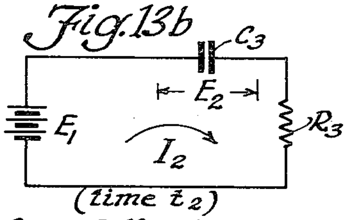
Figure 14A:
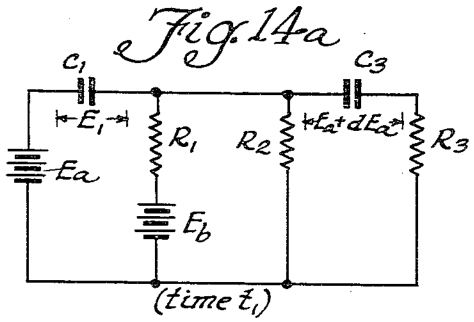
Figure 14B:
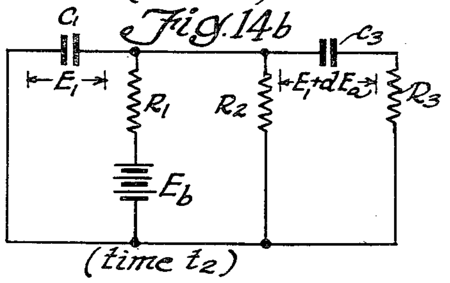

The circuit of Fig. 12 may now be redrawn in accordance with Equation 27 and appears as shown in Fig. 14*a* at time $t_1$ and as shown in Fig. 14*b* at time $t_2$. Since the circuits of Figs. 14*a* and 14*b* are suitable for Thevenin transformation, these circuits may be respectively transformed into the circuits shown in Figs. 15*a* and 15*b* for the corresponding times $t_1$ and $t_2$, and as indicated in the drawings the equivalent series of transformed resistor $R_t$ equals:

$$\frac{R_1R_2R_3}{R_1R_2+R_1R_3+R_2R_3}=R_T \tag{28}$$

and the equivalent voltage source $E_T$ is equal to $$\frac{E_BR_2R_3+E_1R_1R_2+dE_aR_1R_2}{R_1R_2+R_1R_3+R_2R_3}=E_T \tag{29}$$

Figure 15A:
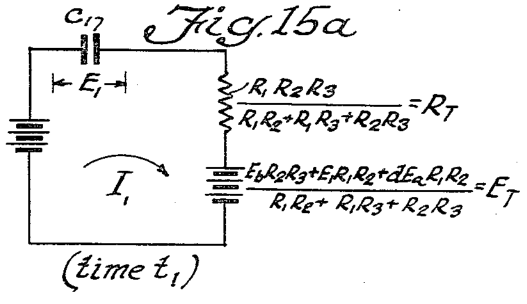
Figure 15B:
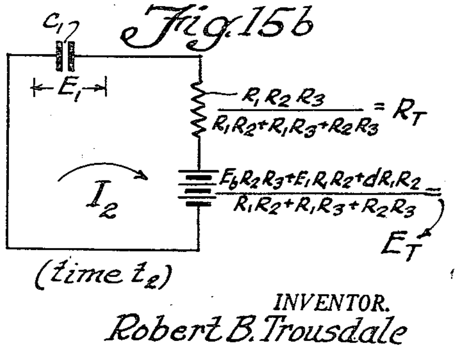

Applying Kirchoff's laws to the circuits of Figs. 15*a* and 15*b* and solving for $I_1$ and $I_2$, we have:

$$I_1=\frac{E_a+E_1-E_T}{R_T} \tag{30}$$

$$I_2=\frac{E_1-E_T}{R_T} \tag{31}$$

Equating charges to zero as before and substituting in Equations 30 and 31, we have:

$$E_1=E_T-dE_a \tag{32}$$

Substituting Equation 29 in Equation 32, we have:

$$E_1=\frac{E_BR_2R_3+E_1R_1R_2+dE_aR_1R_2}{R_1R_2+R_1R_3+R_2R_3}-dE_a \tag{33}$$

or $$E_1=\frac{E_BR_2R_3-dE_a(R_1R_3+R_2R_3)}{R_1R_3+R_2R_3} \tag{34}$$

Since $E_1$, the voltage across the condenser $C_1$, must be positive for the rectifier $X_1$ to conduct at all times, the circuit elements must bear the following relationship:

$$E_BR_2R_3>dE_a(R_1R_3+R_2R_3) \tag{35}$$

from which we obtain the relationship $$\frac{E_B}{R_1+R_2}>\frac{dE_a}{R_2} \tag{36}$$

From an examination of Relationship 36 it is evident that the current delivered by $E_B$ is equal to the pulse current multiplied by the duty cycle *d* in the limiting case. It will also be evident that the value of the load resistor $R_3$ does not enter into this relationship. Thus, Relationship 36 is the basic relationship controlling the magnitudes of $E_B$, $R_1$, and $R_2$ to obtain complete gating action in the circuit of Fig. 11.

In considering the right-hand half of the circuit of Fig. 11 during the above-described pulse gating action, it will be understood that capacitors $C_2$ and $C_4$ will charge to the value of $E_B$ with no input pulse $P_2$ impressed upon the cable 71. The crystal rectifier $X_2$ conducts during the pulse $P_2$ and charges both the condensers $C_2$ and $C_4$ an additional amount to prevent the rectifier $X_2$ from conducting between the pulses $P_2$. Since the left-hand half of the circuit of Fig. 11 exhibits substantially zero generator impedance, the pulses $P_2$ do not appear across the common load resistor $R_3$. Furthermore, since the voltage across $C_3$ is in such a direction as to unblock the rectifier $X_2$, the voltage across the condensers $C_2$ and $C_4$ must be somewhat higher in order to buck out the potential across the condenser $C_3$.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. A pulse gating circuit, comprising a control tube, a gating rectifier included in the space current path of said control tube, means for applying pulses to one electrode of said rectifier in the correct polarity normally to cause said rectifier to conduct, means including a condenser connected to said one electrode of said rectifier for biasing said rectifier against conduction, means for rendering said control tube conductive to produce a predetermined minimum value of space current flow through said rectifier, and means for deriving said pulses from the other electrode of said gating rectifier during periods when said control tube is conductive.

2. A pulse gating circuit, comprising a control tube, a gating rectifier included in the space current path of said control tube, means for applying pulses to one electrode of said rectifier in the correct polarity normally to cause said rectifier to conduct, means for rendering said control tube conductive to produce a predetermined minimum value of space current flow through said rectifier, means for deriving said pulses from the other electrode of said gating rectifier during periods when said control tube is conductive, and means including a resistor included in the space current path of said control tube for deriving a control pulse from said control tube when said tube is rendered conductive.

3. A pulse gating circuit, comprising a control tube, a gating rectifier included in the space current path of said control tube, means for applying pulses to one electrode of said rectifier in the correct polarity normally to cause said rectifier to conduct, means for rendering said control tube conductive to produce a predetermined minimum value of space current flow through said rectifier, means for deriving said pulses from the other electrode of said gating rectifier during periods when said control tube is conductive, and means included in the space current path of said control tube between the other electrode of said gating rectifier and said control tube for decoupling said pulses from said control tube.

4. A pulse gating circuit, comprising a control tube, a gating rectifier included in the space current path of said control tube, means for applying pulses to one electrode of said rectifier in the correct polarity normally to cause said rectifier to conduct, means for rendering said control tube conductive to produce a predetermined minimum value of space current flow through said rectifier, means for deriving said pulses from the other electrode of said gating rectifier during periods when said control tube is conductive, means including a first resistor included in the space current path of said control tube and connected to the other electrode of said gating rectifier for decoupling said pulses from said control tube, and means including a second resistor included in the space current path of said control tube between said first resistor and said control tube for deriving a control pulse from said control tube when said tube is rendered conductive.

5. A pulse gating circuit comprising, a chain of gaseous discharge cold cathode control tubes, a gating rectifier included in the space current path of each of said control tubes, means for impressing pulses occurring in successive pulse time positions within repetitive pulse time position frames individually upon one electrode of each of said gating rectifiers, means including an impedance common to the cathode of each of said control tubes for repeatedly driving the cathodes of said control tubes positively in accordance with an incoming pulse signal thereby to render all of said control tubes non-conductive during the pulse intervals of said incoming signal, means included in the space current path of each of said control tubes for developing a control pulse of predetermined polarity from the conducting one of said control tubes when said one tube is rendered non-conductive, means for coupling said control pulse to the next succeeding control tube in said chain thereby to fire said control tubes in sequence in accordance with the number of pulses in said incoming pulse signal, and means for deriving from the other electrode of the gating rectifier associated with that one of said control tubes which remains conductive at the end of said incoming pulse signal those pulses impressed upon said one electrode thereof.

6. A pulse gating circuit comprising, a chain of control tubes, a gating rectifier included in the space current path of each of said control tubes, means for impressing positive pulses occurring in successive pulse time positions within repetitive pulse time position frames individually upon the anode of each of said gating rectifiers, means including an impedance common to the cathode of each of said control tubes for repeatedly driving the cathodes of said control tubes positively in accordance with an incoming pulse signal thereby to render all of said control tubes non-conductive during the pulse intervals of said incoming signal, means included in the space current path of each of said control tubes for developing a control pulse of predetermined polarity from the conducting one of said control tubes when said one tube is rendered non-conductive, means for coupling said control pulse to the next succeeding control tube in said chain thereby to fire said control tubes in sequence in accordance with said incoming pulse signal, the current flow through that one of said control tubes which remains conductive at the end of said incoming pulse signal being sufficient in magnitude to cause the gating rectifier included in the space current path thereof to operate on the linear portion of the current-voltage characteristic thereof, and means for deriving from the cathode of said conducting rectifier the positive pulses impressed upon the anode thereof.

7. A pulse gating circuit comprising, a chain of gaseous discharge cold cathode control tubes, a gating rectifier included in the space current path of each of said control tubes, means for impressing pulses occurring in successive pulse time positions within repetitive pulse time position frames individually upon one electrode of each of said gating rectifiers, means including an impedance common to the cathode of each of said control tubes for pulsing the cathodes of said control tubes positively in accordance with an incoming pulse signal thereby to render all of said control tubes non-conductive during the pulse interval of said incoming signal, means included in the space current path of each of said control tubes for developing a control pulse of predetermined polarity from the conducting one of said control tubes when said one tube is rendered non-conductive, decoupling means included in the space current path of each of said control tubes between said gating rectifiers and said pulse developing means, means for coupling said control pulse to the next succeeding control tube in said chain thereby to fire said control tubes in sequences in accordance with said incoming pulse signal, the current flow through said control tubes when sequentially rendered conductive being sufficient to produce a current flow through the gating rectifier included in the space current path thereof which is sufficient in magnitude to cause said gating rectifier to operate on the linear portion of the current-voltage characteristic thereof, and means for deriving from the other electrode of the gating rectifier associated with that one of said control tubes which remains conductive at the end of said incoming pulse signal the pulses impressed upon said one electrode thereof.

8. A pulse gating circuit comprising, a plurality of gating rectifiers, a coincidence gating tube for each of said rectifiers, means for separately impressing pulses occurring in successive pulse time positions in repetitive time position frames on one electrode of successive ones of said rectifiers and one control electrode of corresponding ones of said gating tubes, means for simultaneously impressing pulses occurring in a predetermined pulse time position on the second control electrodes of all of said gating tubes, thereby to cause one of said gating tubes to conduct upon coincidence of the pulses impressed on the first and second control electrodes thereof, means responsive to conduction of said one gating tube for producing a unidirectional flow of current through the gating rectifier associated therewith, and means common to the other electrode of all of said rectifiers for deriving pulses transmitted through said unilaterally conducting rectifier.

9. A pulse gating circuit comprising, a plurality of gating rectifiers, a coincidence gating tube for each of said rectifiers, means for impressing positive pulses occurring in successive pulse time positions in repetitive pulse time position frames individually upon the anodes of said rectifiers and upon one control electrode of corresponding ones of said gating tubes, means for simultaneously impressing pulses occurring in a predetermined pulse time position on the second control electrodes of all of said gating tubes, thereby to cause one of said gating tubes to conduct upon coincidence of the pulses impressed on the first and second control electrodes thereof, means responsive to conduction of said one gating tube for producing a unidirectional flow of current through the gating rectifier associated therewith, and means common to the other electrode of all of said rectifiers for deriving pulses transmitted through said unilaterally conducting rectifier.

10. A pulse gating circuit comprising, a plurality of gating rectifiers, a coincidence gating tube for each of said rectifiers, means for separately impressing pulses occurring in successive pulse time positions in repetitive time position frames upon one electrode of successive ones of said rectifiers and upon one control electrode of corresponding ones of said gating tubes, means for simultaneously impressing pulses occurring in a predetermined pulse time position on the second control electrodes of all of said gating tubes, thereby to cause one of said gating tubes to conduct upon coincidence of the pulses impressed on the first and second control electrodes thereof, means responsive to conduction of said one gating tube for producing a unidirectional flow of current through the gating rectifier associated therewith, means common to the other electrode of all of said rectifiers for deriving pulses transmitted through said unilaterally conducting rectifier, and means including an impedance common to the anode of each of said gating tubes for preventing the transmission of pulses through the other ones of said rectifiers when said one gating tube is conducting.

11. A pulse gating circuit comprising, a plurality of coincidence tube circuits, each of said coincidence tube circuits including a gating rectifier and a gaseous discharge gating tube, means including a plurality of low impedance sources for impressing pulses occurring in successive pulse time positions in repetitive pulse time position frames individually upon one electrode of said gating rectifiers and upon one control electrode of corresponding ones of said gating tubes, means for simultaneously impressing pulses occurring in a predetermined pulse time position upon a second control electrode of each of said gating tubes, thereby to cause one of said tubes continuously to conduct upon coincidence of the pulses impressed upon the first and second control electrodes thereof, means responsive to current flow through said one gating tube for causing the gating rectifier associated therewith continuously to conduct irrespective of the application of pulses to said one electrode thereof, and output means common to the other electrodes of all of said gating rectifiers for deriving only those pulses transmitted through said continuously conductive gating rectifier.

12. A pulse gating circuit, comprising a source of input pulses of an amplitude $E_a$, a coupling condenser, a gating rectifier, an output resistor $R_2$, means connecting said coupling condenser, said rectifier and said output resistor in series across said source, an unblocking resistor $R_1$, a unidirectional unblocking potential $E_b$, means connecting said unblocking resistor and potential in series to one electrode of said rectifier, thereby to cause said rectifier continuously to conduct, said unblocking potential $E_b$ and pulse amplitude $E_a$ bearing the relationship—

$$\frac{E_b}{E_a} > d\,\frac{(R_1+R_2)}{R_2}$$

where $d$ is the duty cycle of said input pulses, whereby said pulses are transmitted substantially without change through said rectifier to said output resistor.

13. A pulse gating circuit comprising, a chain of control valves, a gating rectifier included in the current path of each of said control valves, means for impressing pulses occurring in successive time positions within repetitive time position frames successively upon one electrode of said gating rectifiers, means including an impedance common to said control valves for repeatedly rendering said control valves non-conductive during the pulse intervals of an incoming pulse signal, means included in the current path of each of said control valves for developing a control pulse of predetermined polarity from the conducting one of said control valves when said one tube is rendered non-conductive, means for coupling said control pulse to the next succeeding control valve in said chain thereby to render said control valves conductive in sequence in accordance with the number of pulses in said incoming pulse signal, and means for deriving from the other electrode of the gating rectifier associated with that one of said control valves which remains conductive at the end of said incoming pulse signal those pulses impressed upon said one electrode thereof.

14. A pulse gating circuit comprising, a plurality of gating rectifiers, a coincidence gating valve for each of said rectifiers, means for impressing pulses occurring in successive time positions within repetitive time position frames on one electrode successively upon one electrode of said rectifiers and one electrode of corresponding ones of said gating valves, means for simultaneously impressing pulses occurring in a predetermined time position on a second electrode of said gating valves, thereby to cause one of said gating valves to conduct upon coincidence of the pulses impressed upon the first and second electrodes thereof, means responsive to conduction of said one gating valve for producing a unidirectional flow of current through the gating rectifier associated therewith, and means common to the other electrode of said rectifiers for deriving pulses transmitted through said unilaterally conducting rectifier.

15. A pulse gating circuit, comprising a control valve, a gating rectifier included in the current path of said control valve, means for applying pulses to one electrode of said rectifier in the correct polarity normally to cause said rectifier to conduct, means including a condenser connected to said one electrode of said rectifier for biasing said rectifier against conduction, means for rendering said control valve conductive to produce a predetermined minimum value of current flow through said rectifier, and means for deriving said pulses from the other electrode of said gating rectifier during periods when said control valve is conductive.

References Cited in the file of this patent

UNITED STATES PATENTS

| | | |
|---|---|---|
| 2,535,377 | Titterton | Dec. 26, 1950 |
| 2,541,399 | Blake | Feb. 13, 1951 |
| 2,557,729 | Eckert | June 19, 1951 |
| 2,577,015 | Johnson | Dec. 4, 1951 |
| 2,597,796 | Hindall | May 20, 1952 |